2 Sheets—Sheet 1.
E. R. & T. W. SHERIDAN.
Machine for Cutting Paper.
No. 9,115. Reissued Mar. 9, 1880.
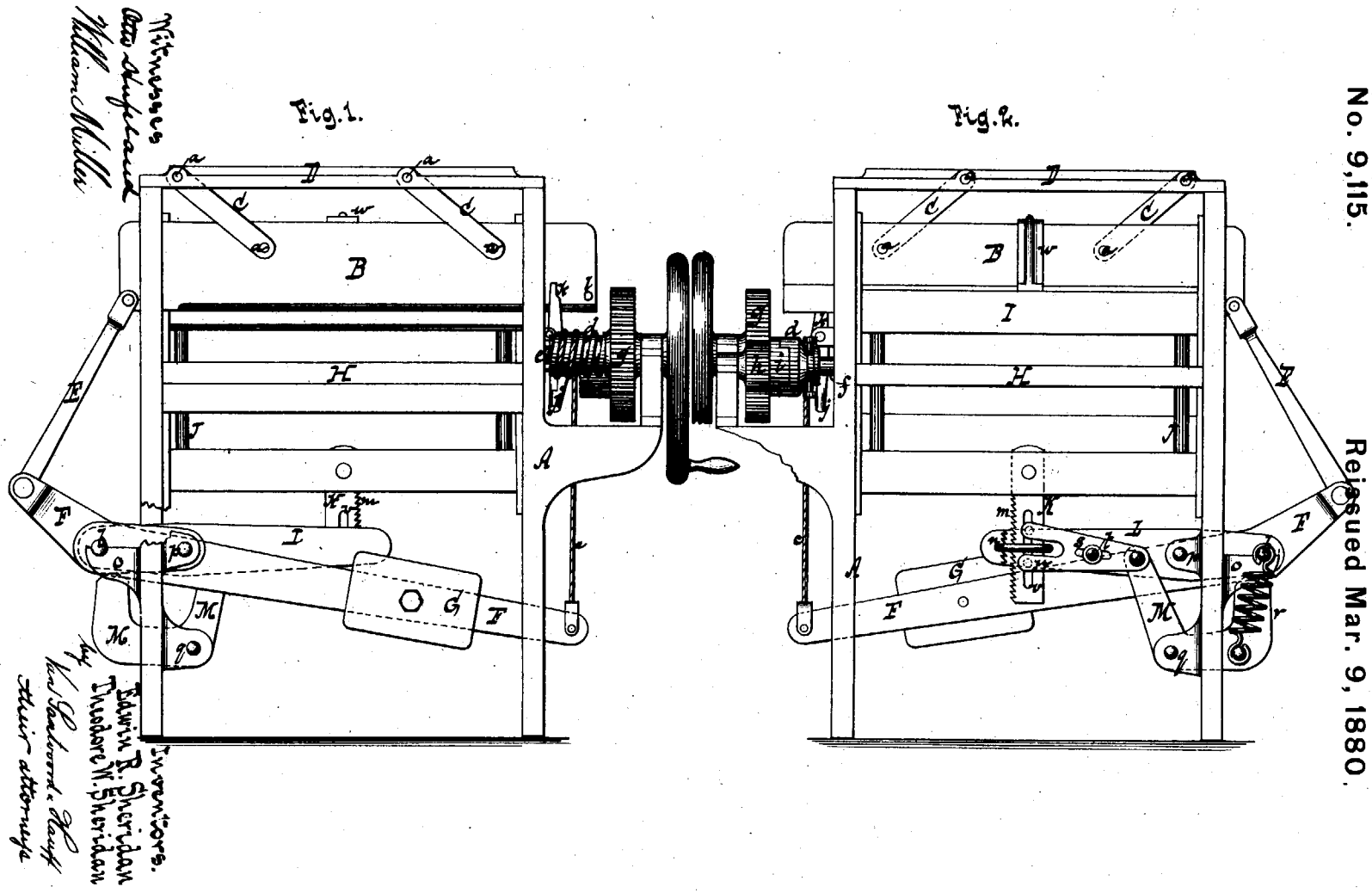
Witnesses
Otto Hufeland
William Miller
Inventors.
Edwin R. Sheridan
Theodore W. Sheridan
by Van Santvoord & Hauff
their attorneys
N. PETERS, PHOTO-LITHOGRAPHER, WASHINGTON, D. C.

2 Sheets—Sheet 2.

E. R. & T. W. SHERIDAN.

Machine for Cutting Paper.

No. 9,115. Reissued Mar. 9, 1880.

Witnesses
Otto Hufeland
William Miller

Inventors.
Edwin R. Sheridan.
Theodore W. Sheridan.
by Van Santvoord & Hauff
his attorneys

N. PETERS, PHOTO-LITHOGRAPHER, WASHINGTON, D. C.

UNITED STATES PATENT OFFICE.

EDWIN R. SHERIDAN AND THEODORE W. SHERIDAN, OF BROOKLYN, N. Y.

MACHINE FOR CUTTING PAPER.

SPECIFICATION forming part of Reissued Letters Patent No. 9,115, dated March 9, 1880.

Original No. 190,089, dated April 24, 1877. Reissue No. 8,205, dated April 30, 1878. Application for reissue filed January 14, 1880.

*To all whom it may concern:*

Be it known that we, EDWIN R. SHERIDAN and THEODORE W. SHERIDAN, both of Brooklyn, in the county of Kings and State of New York, have invented a new and useful Improvement in Machines for Cutting Paper, which improvement is fully set forth in the following specification, reference being had to the accompanying drawings, in which—

Figure 3:
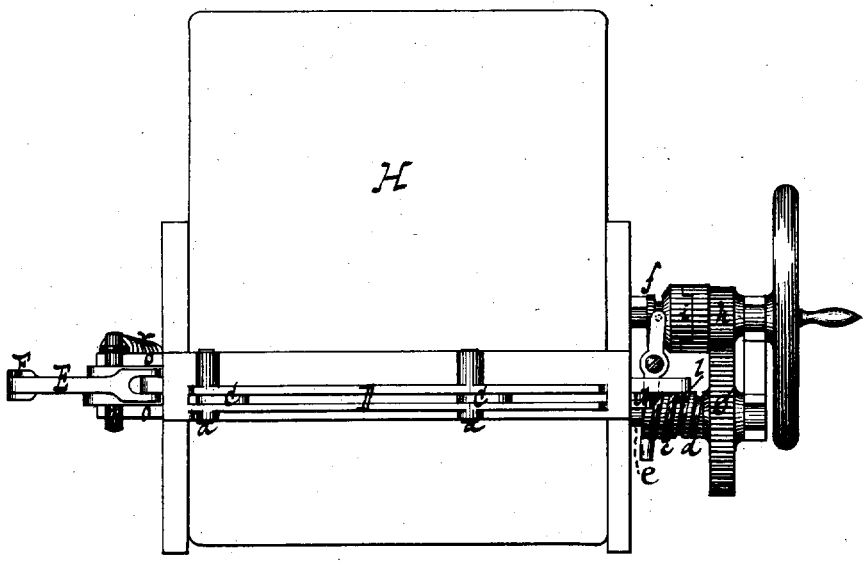
Figure 4:
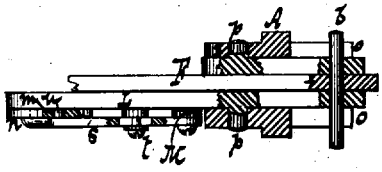

Figure 1 represents a front view. Fig. 2 is a rear view. Fig. 3 is a plan or top view. Fig. 4 is a section in the plane *x x*, Fig. 2.

Similar letters indicate corresponding parts.

This invention consists in the combination, in a paper-cutting machine, of a knife and clamping-bar, both arranged above a cutting-table, a lever, and impelling mechanism, substantially as hereinafter described, for imparting positive motion through said lever to the knife and clamping-bar separately through devices, substantially as herein described, between the impelling mechanism and said knife and bar, whereby the force of the impelling mechanism is divided between the knife and clamping-bar during the operation of cutting.

It consists, also, in the combination, in a paper-cutter, of a knife and clamping-bar, both arranged above a cutting-table, a lever, and mechanism, substantially as hereinafter described, whereby said lever is caused to act on the knife, and when the knife meets with sufficient resistance causes the lever to act on the clamping-bar, which is connected with said lever separately from the knife, through devices substantially as hereinafter set forth, to be depressed upon the material to be cut with a pressure commensurate to the resistance to be overcome by the knife, as more fully hereinafter specified.

With the knife, the clamping-frame, and the levers which impart motion to the same is also combined a locking mechanism, which connects the clamp to the knife-lever during the operation of cutting, and which is released as soon as the knife has passed clear through the material to be cut.

With the knife is combined a pin or projection, which acts on the clutch-lever so as to release the shaft which imparts motion to the knife, and to allow said knife to rise as soon as it has passed clear through the material to be cut.

In the drawings, the letter A designates a frame, which forms the bearings for the working parts of my cutting apparatus. B is the knife, which is suspended from the links C C, swinging on points *a a*, which have their bearings in the top bar of the frame A. Said knife is guided in slots formed in the side pieces of the frame A, and one of its ends is connected by a rod, E, with one end of a lever, F, that has its fulcrum on a pivot, *b*, and extends through the frame A, as shown in Figs. 1 and 2 of the drawings. From the opposite end of said lever extends a rope or chain, *c*, to a drum, *d*, which is firmly mounted on a counter-shaft, *e*, that has its bearings in the frame A.

The counter-shaft *e* is geared together with a driving-shaft, *f*, by means of cog-wheels *g* *h*, the cog-wheel *g* being firmly mounted on the counter-shaft, while the cog-wheel *h* turns loosely on the driving-shaft, and is thrown in gear with the same by means of a clutch, *i*, which is operated by a clutch-lever, *j*.

When the driving-shaft is revolved in the proper direction and the clutch *i* is thrown in gear the chain *c* winds upon the drum *d*, and by the action of the lever F the knife is caused to swing down and to act on the material to be cut with a drawing motion.

With the clutch-lever *j* is combined a releasing-lever, *k*, and as soon as the knife has passed clear through the material to be cut, and before it is depressed on the platform supporting such material, a pin, *l*, secured to the knife, strikes the releasing-lever, the clutch is thrown out of gear, and the knife is raised automatically by a weight, G, attached to the lever F.

The material to be cut rests on a table or platform, H, secured to the machine-frame A. In order to enable the knife to produce a clean cut, the material must be clamped tightly on the platform H when the action of the knife takes place. This object is effected by a clamping-bar, I, which is secured to a frame, J, sliding up and down in the machine-frame A. From the clamping-bar I extends a hook, *w*, and when the knife B rises to the position shown in Figs. 1 and 2 it meets said hook, and thus carries with it the clamping-bar, whereby the latter is lifted from the material resting on the platform. To the lower part of the clamping-frame J is jointed a bar, K, in one edge of which are cut ratchet-teeth *m*, pointing in an upper direction. As the knife B descends the clamping-bar I is first brought in contact with the material to be cut, so as to bear upon the same with a pressure commensurate to its own weight, together with that of the clamping-frame J, such pressure being sufficient to hold the material in the proper position until the knife begins to cut. As soon as this takes place the rack-bar K is thrown in gear with a dog, *n*, and the clamping-bar is forcibly depressed upon the material to be cut by the following mechanism: The fulcrum-pin *b* of the knife-lever rests upon two lugs, *o*, projecting from the machine-frame A, and it extends through the outer end of a lever, L, that swings on a pivot, *p*, and to the inner end of which is secured the dog *n*. With the lever L is combined a U-shaped lever, M, which has its fulcrum on a pivot, *q*, in the machine-frame, and the outer end of which is drawn up by a spring, *r*, so as to be in contact with the lever L, while its inner end is pivoted to a slide, *s*, which is guided on a pin, *t*, secured to the lever L, and from which projects a pin, *u*, into a slot, *v*, in the rack-bar K.

When the knife begins to cut the fulcrum-pin *b* of the knife-lever F moves upward, the rack-bar K is thrown in gear with the dog *n*, and the lever L, being connected at its outer end to the movable fulcrum *b*, is depressed at its inner end, so as to depress the clamping-bar I on the material to be cut; and, since the upward motion of the fulcrum *b* increases with the resistance to be overcome by the knife, the clamping-bar is depressed upon the material with a pressure commensurate to the resistance to be overcome by the knife in cutting. In other words, the impelling mechanism is caused to divide its action between the knife B and the clamping-bar I during the operation of cutting.

When the cut has been completed and the knife B is released the fulcrum-pin *b* sinks back to its place upon the lugs *o*, the lever L depresses the outer end of the U-shaped lever M, the rack-bar K is thrown out of gear with the dog *n*, the knife is raised by the action of the weight G, and the clamping-bar I is lifted clear of the material by the contact of the knife with the hook *w*.

By this means we obtain a machine which can be operated with facility, which produces clear cuts, and in which all danger of injuring the knife by depressing it upon the platform supporting the material to be cut is avoided.

What we claim as new, and desire to secure by Letters Patent, is—

1. The combination, in a paper-cutting machine, of a knife and clamping-bar, both arranged above a cutting-table, a lever, and impelling mechanism, substantially as described, for imparting positive motion through said lever to the knife and clamping-bar separately through devices, substantially as described, between the impelling mechanism and said knife and bar, whereby the force of the impelling mechanism is divided between the knife and clamping-bar during the operation of cutting.

2. The combination, in a paper-cutter, of a knife and clamping-bar, both arranged above a cutting-table, a lever, and mechanism, substantially as described, whereby said lever is caused to act on the knife, and when the knife meets with sufficient resistance causes the lever to act on the clamping-bar, which is connected with said lever separately from the knife, through devices substantially as set forth, to be depressed upon the material to be cut with a pressure commensurate to the resistance to be overcome by the knife.

3. The combination, with the knife, the clamping-bar, the levers imparting motion to the same, and the movable fulcrum-pin *b*, of a locking mechanism consisting of the rack-bar K, dog *n*, spring-lever M, and slide S, substantially as and for the purpose set forth.

4. The combination, with the knife B and table H, driving-shaft *f*, clutch *i*, and clutch-lever *j*, of a pin or projection, *l*, upon the knife, and a releasing-lever, *k*, all constructed and adapted to operate substantially as described, for the purpose set forth.

In testimony that we claim the foregoing we have hereunto set our hands and seals this 6th day of January, 1880.

EDWIN R. SHERIDAN. [L. S.]
THEODORE W. SHERIDAN. [L. S.]

Witnesses:
W. HAUFF,
CHAS. WAHLERS.